United States Patent [19]

Willis

[11] 4,353,014
[45] Oct. 5, 1982

[54] TELEVISION RECEIVER FERRORESONANT LOAD POWER SUPPLY WITH REDUCED SATURABLE REACTOR CIRCULATING CURRENT

[75] Inventor: Donald H. Willis, Indianapolis, Ind.

[73] Assignee: RCA Corporation, New York, N.Y.

[21] Appl. No.: 255,396

[22] Filed: Apr. 20, 1981

[51] Int. Cl.³ .............................................. H01J 29/70
[52] U.S. Cl. .................................. 315/411; 323/310; 315/400
[58] Field of Search .............. 315/411, 400; 358/190; 323/306, 307, 310

[56] References Cited

U.S. PATENT DOCUMENTS

| | | | |
|---|---|---|---|
| 1,985,634 | 12/1934 | Fleming | 171/119 |
| 2,432,343 | 12/1947 | Short | 323/60 |
| 2,706,271 | 4/1955 | Fletcher | 323/48 |
| 2,811,689 | 10/1957 | Balint | 323/48 |
| 2,999,973 | 9/1961 | Medlar | 323/60 |
| 3,219,881 | 11/1965 | Rudaz | 315/278 |
| 3,247,449 | 4/1966 | Medlar | 323/60 |
| 3,247,450 | 4/1966 | Medlar | 323/60 |
| 3,341,766 | 9/1967 | Rhyne, Jr. | 321/9 |
| 3,398,292 | 8/1968 | Kuba | 307/51 |
| 3,739,255 | 6/1973 | Leppert | 321/16 |
| 3,868,538 | 2/1975 | Blanchard | 315/411 |
| 3,988,662 | 10/1976 | Hunter | 323/48 |
| 4,019,122 | 4/1977 | Ryan | 323/60 |
| 4,075,547 | 2/1978 | Wroblewski | 323/60 |
| 4,240,013 | 12/1980 | Wedam | 315/411 |

FOREIGN PATENT DOCUMENTS

| | | |
|---|---|---|
| 3003321 | 7/1980 | Fed. Rep. of Germany . |
| 1096622 | 12/1967 | United Kingdom . |
| 1254077 | 11/1971 | United Kingdom . |
| 2041668 | 9/1980 | United Kingdom . |

OTHER PUBLICATIONS

Paper presented at Convention of Institute of Television Engineers of Japan, "Stabilized Power Supply Incorporating High Frequency Ferro Resonance Transformer", by T. Kadota and others, dated 10-7-77.
"The Geometry of Regulating Transformers", by N. R. Grossner, *IEEE Transactions on Magnetics*, vol. Mag. 14, No. 2, Mar. 1978.

*Primary Examiner*—Theodore M. Blum
*Attorney, Agent, or Firm*—Eugene M. Whitacre; Paul J. Rasmussen; Joseph J. Laks

[57] ABSTRACT

The primary winding of a high leakage inductance transformer is coupled to a source of alternating input voltage to develop alternating polarity output voltages across tightly coupled secondary windings, including a high voltage winding of the transformer. Various DC supply voltages, including the ultor voltage, are derived from the secondary winding output voltages. To regulate the secondary winding output voltages, a ferroresonant circuit comprising a capacitor and a saturable reactor is coupled as a load circuit to one of the transformer secondary windings. When the saturable reactor magnetically saturates during each half cycle of the alternating polarity output voltage, a circulating current is generated and flows between the saturable reactor and the capacitor. To enhance the power supply efficiency and reduce the temperature rise within the magnetizable core of the saturable reactor, the parameters of the transformer and ferroresonant load circuit are selected so as to generate a relatively low amplitude circulating current. To improve output voltage regulation when a low amplitude circulating current is developed, a compensating drive winding is provided that is magnetically tightly coupled with the primary winding of the high leakage transformer. The compensating drive winding is coupled in series with the saturable reactor winding across the capacitor and polarized relative to the capacitor coupled transformer secondary so as to oppose the tendency of the output voltage amplitude or half-cycle volt-second area to vary with variations in input voltage amplitude.

21 Claims, 4 Drawing Figures

TELEVISION RECEIVER FERRORESONANT LOAD POWER SUPPLY WITH REDUCED SATURABLE REACTOR CIRCULATING CURRENT

This invention relates to ferroresonant television power supplies.

A ferroresonant power supply may be used to provide a regulated ultor voltage and a regulated B+ scanning voltage for a television receiver. When operated at a relatively high input frequency, such as at the horizontal deflection frequency of about 16 KHz, a ferroresonant power supply is a relatively compact and low weight unit which provides inherent output voltage regulation without the need for relatively complex and expensive electronic regulator control circuitry.

In the U.S. patent application of D. H. Willis, Ser. No. 220,847, filed Dec. 29, 1980, entitled "TELEVISION RECEIVER FERRORESONANT LOAD POWER SUPPLY", herein incorporated by reference, a ferroresonant power supply is described which includes a ferroresonant saturable reactor load circuit coupled across a secondary output winding of a high leakage transformer. A source of unregulated alternating input voltage of a horizontal deflection frequency, $1/T_H$, is coupled to the primary winding of the transformer. A plurality of other secondary output windings, including a high voltage output winding, are magnetically tightly coupled to the ferroresonant load circuit coupled output winding.

Various television receiver DC voltages are derived from the alternating polarity voltages developed across the transformer secondary windings, including a DC ultor voltage derived from the voltage developed across the high voltage winding and a B+ scanning voltage derived from the voltage developed across a low voltage secondary output winding. The ferroresonant load circuit regulates the voltage developed across one of the transformer secondary output windings, thereby regulating the voltages developed across all of the other secondary output windings.

The ferroresonant load circuit comprises a capacitor and a saturable reactor. The saturable reactor comprises a winding located on a magnetizable core. During each half cycle of the alternating polarity output voltage, the saturable reactor core magnetically saturates and a circulating current flows between the capacitor and the saturable reactor winding.

A feature of the invention is a ferroresonant load power supply that allows the amplitude of the circulating current to be relatively low without at the same time producing a decreased output voltage regulation. A relatively low amplitude circulating current is desirable for good circuit efficiency in that relatively low $I^2R$ current losses are incurred in the saturable reactor winding.

During operation of the ferroresonant load power supply, the saturable reactor core heats up to an equilibrium operating temperature above the ambient temperature. Hysteresis and eddy current losses in the saturable reactor core contribute to the heating up of the core. Additionally, the core heats up due to heat transfer from the saturable reactor winding, which winding is subject to $I^2R$ heating by the circulating current flowing therein. Maintaining a relatively low amplitude circulating current therefore reduces the heating of the saturable reactor core and reduces the core equilibrium operating temperature.

The saturation flux density Bsat of the saturable reactor core material decreases with increasing core operating temperature. Since the regulated output voltage is a function of the saturation flux density Bsat, reduced heating of the core by reducing the amplitude of the circulating current in the saturable reactor winding reduces the amount of temperature induced drop in output voltage occurring from the instant the television receiver is turned on to the instant the core reaches the higher equilibrium operating temperature.

Another feature of the invention is the enablement of the amplitude of the circulating current in the ferroresonant load circuit to be reduced without also degrading the regulation of the output voltage. Without use of the compensating mechanism provided by the inventive arrangements, output voltage regulation may degrade as the amplitude of the circulating current decreases. By using the inventive arrangements, a compensating mechanism is provided that enables the output voltage to be maintained relatively well regulated even though the amplitude of the circulating current is reduced.

In accordance with the invention, a saturating core power supply is provided to develop a regulated voltage for a television display. The power supply includes a saturable reactor having a magnetizable core and a winding located on the core. A magnetizing current is developed in the reactor winding by a source of alternating input voltage. The magnetizing current generates an alternating magnetic flux in the core that links the winding so as to develop an alternating polarity output voltage. A capacitance develops a circulating current that generates a magnetic flux in the core section associated with the reactor winding. The circulating current generated magnetic flux aids in magnetically saturating the associated core section during each cycle of the alternating polarity output voltage. A source of compensating voltage, related to the alternating input voltage, is coupled to the saturable reactor winding so that the combined effect of the development of the circulating current by the capacitance and the application of the compensating voltage to the saturable reactor winding provides regulation of the alternating polarity output voltage.

In a further embodiment of the invention, the magnetizing current for the saturable reactor is developed by a transformer having a plurality of windings. The alternating input voltage source is coupled to a first one of the plurality and the regulated alternating polarity output voltage is developed across a second one of the plurality. The source of compensating voltage comprises a third one of the plurality of the transformer windings.

In a still further embodiment, the transformer comprises a high leakage transformer with the first and second aforementioned transformer windings being magnetically loosely coupled to each other and the first and third windings being magnetically tightly coupled to each other. The saturable reactor winding and the transformer third winding are coupled in series across the capacitance, with the circulating current, when developed by the capacitance, flowing in the third winding. The second and third transformer windings are polarized relative to each other so as to mantan the amplitude of the output voltage relatively unchanged with input voltage variations.

In a specific embodiment of the invention, the regulated alternating polarity output voltage is stepped up by a high voltage winding magnetically tightly coupled to the transformer second winding. The stepped up voltage is rectified by a high voltage rectifier arrangement to provide a DC ultor voltage at an ultor terminal. In another specific embodiment of the invention, a low voltage secondary winding of the transformer, tightly coupled to the second winding, is coupled to a deflection generator and provides thereto a regulated B+ scanning voltage.

Figure 1:
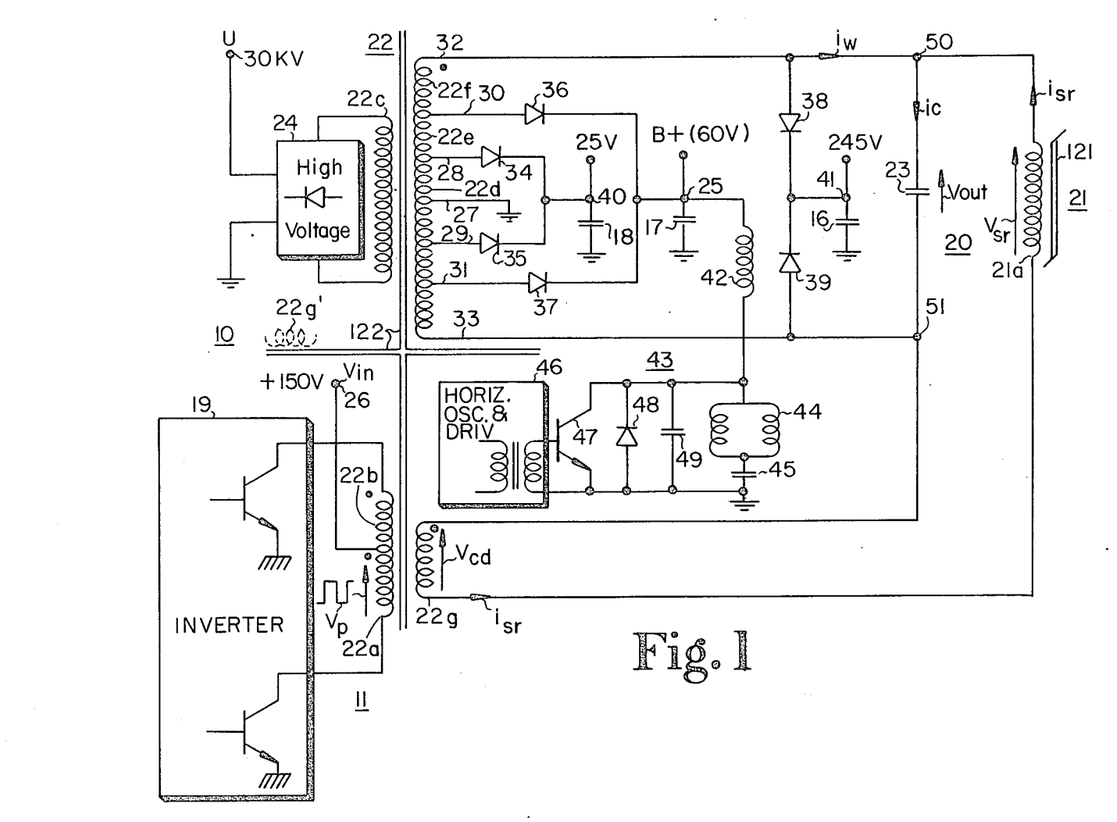
FIG. 1 illustrates a deflection circuit and ferroresonant power supply embodying the invention.

In FIG. 1, a ferroresonant television low and high voltage power supply 10 comprises a transformer 22 and a ferroresonant saturable reactor load circuit 20. A primary winding of transformer 22, comprising equal-turn winding sections 22a and 22b, is coupled to a source 11 of unregulated alternating input voltage. Source 11 comprises an inverter 19 and a DC input terminal 26 coupled to a center tap connection of primary winding sections 22a and 22b. An unregulated DC voltage Vin is applied to terminal 26. Inverter 19 is operated at a high frequency of, for example, the 15.75 KHz horizontal deflection frequency, or at an even higher frequency if desired. If operated at the horizontal frequency, inverter 19 develops the alternating input voltage as a horizontal rate square-wave voltage Vp across each of the primary winding sections 22a and 22b.

When the voltage Vp is developed across primary winding sections 22a and 22b, horizontal rate, alternating polarity output voltages are developed across secondary output windings 22d–22f, and across a high voltage secondary output winding 22c. End leads 28 and 29 of output winding 22d are connected, respectively, to full-wave rectifying diodes 34 and 35; end leads 30 and 31 of output winding 22e are coupled, respectively, to full-wave rectifying diodes 36 and 37; and end leads 32 and 33 of output winding 22f are coupled, respectively, to full-wave rectifying diodes 38 and 39. A common center tap lead 27 is coupled to ground.

The alternating polarity output voltage developed across winding 22d is full-wave rectified by diodes 34 and 35 and filtered by a capacitor 18 to develop a DC supply voltage at a terminal 40, of illustratively +25 volts, to energize such television receiver circuits as the vertical deflection circuit and the audio circuit. The alternating polarity output voltage developed across winding 22f is full-wave rectified by diodes 38 and 39 and filtered by a capacitor 16 to develop a DC supply voltage at a terminal 41, of illustratively +245 volts, to energize such circuits as the television receiver picture tube driver circuits.

The alternating polarity output voltage developed across winding 22e is full-wave rectified by diodes 36 and 37 and filtered by a capacitor 17 to develop at a B+ terminal 25 a B+ scan supply voltage for a horizontal deflection generator 43. Horizontal deflection generator 43 is coupled to terminal 25 through an input choke 42 and comprises a horizontal oscillator and driver 46, a horizontal output transistor 47, a damper diode 48, a horizontal retrace capacitor 49 and an S-shaping or trace capacitor 45 coupled in series with a horizontal deflection winding 44. Horizontal deflection generator 43 is energized by the B+ scan supply voltage to develop horizontal scanning or deflection current in horizontal deflection winding 44.

The alternating polarity output voltage developed across high voltage output winding 22c is coupled to a high voltage circuit 24 to develop a DC ultor high voltage or accelerating potential at a terminal U for the television receiver picture tube, not illustrated. High voltage circuit 24 may comprise a conventional voltage multiplier rectifier arrangement of the Cockroft-Walton type, or may comprise a half-wave rectifier arrangement with a plurality of diodes integrally molded as a single unit with a plurality of winding sections, not individually illustrated, of high voltage winding 22c.

Secondary output windings 22d–22f and high voltage secondary output winding 22c are relatively closely or tightly coupled magnetically one to another. To achieve the tight coupling, the windings may be wound concentrically around a common portion of the magnetizable core 122 of transformer 22. Because of the tight magnetic coupling among the windings, regulation of an alternating polarity output voltage developed across one of the secondary output windings provides substantial regulation of the other output voltages developed across the other transformer secondary output windings.

To regulate the secondary output winding voltages against variations in the amplitude of the input voltage Vin and against loading changes by the load circuits coupled to terminals 25, 40 and 51, and beam current loading changes on ultor terminal U, the ferroresonant saturable reactor circuit 20 is coupled as a load circuit across one of the tightly or closely coupled secondary output windings of transformer 22. In FIG. 1, the saturable reactor circuit 20 is illustratively coupled across secondary output winding 22f.

Transformer 22 is designed to incorporate substantial leakage inductance between each of primary winding sections 22a and 22b and each of the tightly coupled regulated secondary windings 22c–22f. The loose coupling of the primary winding with the secondary output windings enables the output voltages to be maintained substantially constant by ferroresonant circuit 20 even though the voltage applied across the primary winding sections changes with variations in the alternating input voltage.

Leakage inductance between primary winding sections 22a and 22b and secondary windings 22c–22f may be designed into transformer 22 by constructing the magnetizable core 122 of the transformer as a closed loop core of rectangular shape. Primary winding 22 may be wound on one leg of core 122 and the output windings 22b–22e may be concentrically wound on another leg. Magnetizable core 122 is designed to operate in the high permeability region below the knee of the B-H characteristic of the core material. Thus, transformer 22 comprises a high leakage, substantially unsaturated transformer.

Ferroresonant saturable reactor load circuit 20 comprises capacitor 23, a compensating drive winding 22g of linear transformer 22 and a separate saturable reactor 21. Saturable reactor 21 comprises a winding 21a located on a magnetizable core 121. Reactor winding 21a is coupled in series with transformer compensating drive winding 22g across capacitor 23. Reactor winding 21a and transformer secondary output winding 22f are conductively coupled but magnetically isolated so that the magnetic flux flowing in reactor core 121 does not link output winding 22f to any significant extent.

Figure 2:
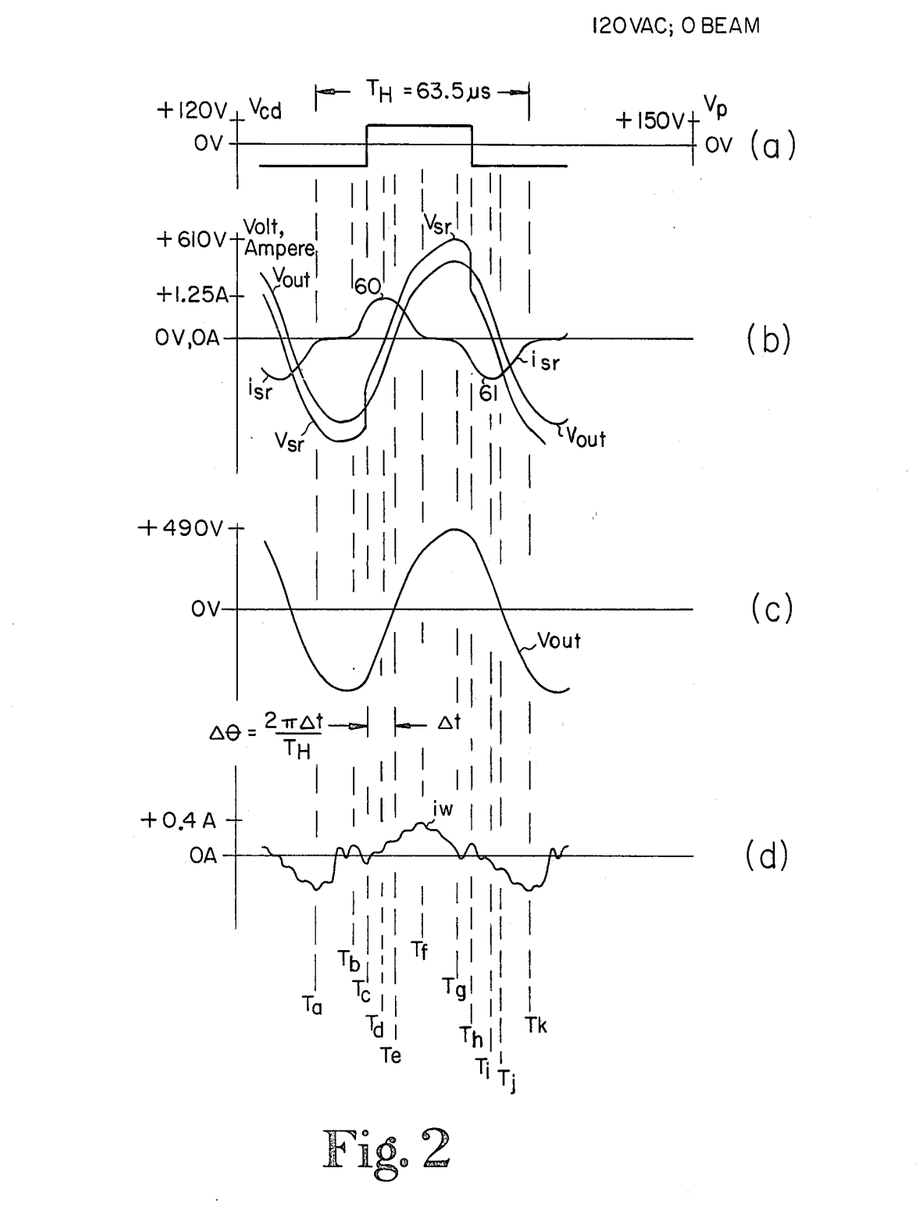
FIGS. 2–4 illustrate waveforms associated with the operation of the circuit of FIG. 1.

Capacitor 23 is coupled across secondary output winding 22f. The regulated output voltage Vout that is developed across output winding 22f is, therefore, also developed across capacitor 23, between terminals 50 and 51 of FIG. 1. The voltage Vout is illustrated in FIG. 2b and again in FIG. 2c.

Compensating drive winding 22g is tightly coupled magnetically to each of the primary winding sections 22a and 22b of transformer 22. The voltage $V_{cd}$ developed across winding 22g is a square-wave voltage in phase with the primary winding voltage $V_p$ and of an amplitude that is related to the amplitude of the primary voltage $V_p$ by the turns ratio of winding 22g to winding 22a. Both primary voltage $V_p$ and compensating voltage $V_{cd}$ are therefore illustrated in FIG. 2a as a single waveform. As the primary voltage $V_p$ varies in amplitude with variations in the amplitude of the unregulated DC voltage Vin, the compensating drive voltage $V_{cd}$ correspondingly varies in amplitude but remains in phase with the primary voltage.

The voltage developed across saturable reactor winding 21a is illustrated in FIG. 2b as the waveform $V_{sr}$. The reactor winding voltage $V_{sr}$ equals the algebraic sum of the capacitor or output voltage Vout and the transformer compensating drive voltage $V_{cd}$.

To regulate the output voltage Vout in a ferroresonant manner, the core 121 of saturable reactor 21 is switched between the magnetically unsaturated state and the magnetically saturated state during each half cycle of the output voltage. In the magnetically unsaturated state, the inductance of the saturable reactor winding 21a is relatively large, illustratively 50 to 100 millihenries. In the magnetically saturated state, the inductance of winding 21a is relatively small, illustratively 0.5 to 2 millihenry; thus, the saturated inductance of winding 21a or the inductance exhibited when core 121 is saturated may be 50 to 100 times smaller than the unsaturated inductance of winding 21a, or the inductance exhibited when core 121 is unsaturated.

As illustrated in FIG. 2b by the current $i_{sr}$, in reactor 21a, during the unsaturated intervals of reactor core 121, between times $T_a$–$T_b$ and $T_f$–$T_g$, the reactor current $i_{sr}$ is near zero, with only a small magnetizing current flowing to generate flux in the reactor core. The applied voltage $V_{sr}$ across reactor winding 21a produces a magnetic flux direction reversal in reactor core 121 from the flux direction existing at time $T_a$, for example, and then the voltage produces a subsequent flux build up in the opposite direction. Within the interval $T_a$–$T_b$, the flux density values of the reactor core 121 are for the most part in the unsaturated region of the core material B-H characteristic.

Near time $T_b$, the voltage that is applied across reactor winding 21a has brought the magnetic flux in reactor core 121 to a point where the corresponding flux density value of the material is above the knee of the B-H characteristic into the saturated region of operation. For explanatory purposes, the magnetically saturated region of operation may be considered that region of the B-H characteristic above the knee that exhibits a significantly reduced permeability when compared to the permeability of the core material below the knee of the B-H characteristic. For a reactor core magnetizable material such as a lithium bismuth ferrite, the relative permeability of the material at a point well beyond the knee, at, for example, 50–100 oersted magnetizing force H, is a quite low value of 2–10, for example, when compared to a relative permeability value of 500–3000, for example, at a point below the knee of the curve.

During the intervals $T_b$–$T_f$ and $T_g$–$T_k$, when saturable reactor winding 21a exhibits a low, saturated inductance, circulating currents 60 and 61, illustrated in FIG. 2b, flow between reactor winding 21a and capacitor 23. The natural frequency of the resonant circuit producing the circulating currents 60 and 61 is determined for the most part by the value of capacitor 23 and the value of the parallel inductance formed by the saturated inductance of reactor winding 21a and the equivalent source inductance of high reactance transformer 22 as observed between terminals 50 and 51. This natural frequency is higher than the horizontal deflection frequency, $1/T_H$, of the alternating input voltage source 11.

During the interval $T_b$–$T_f$ and $T_g$–$T_k$, when the circulating currents 60 and 61 of FIG. 2b flow between saturable reactor winding 21a and capacitor 23, the output voltage Vout, developed across capacitor 23 and transformer secondary output winding 22f, reverses polarity at times $T_e$ and $T_j$ of FIG. 2c and charges to opposite polarity voltages at the end of the circulating current intervals, at time $T_f$ and $T_k$.

The zero-crossover instants of the primary voltage $V_p$ are the same instants $T_c$ and $T_h$ of the zero-crossover instants of the in-phase compensating drive voltage $V_{cd}$ developed across transformer winding 22g; whereas the zero-crossover instants of the output voltage Vout are the instants $T_e$ and $T_j$ of FIG. 2c. Thus, a time delay $\Delta t$, representing a phase delay $\Delta\theta = 2\pi\Delta t/T_h$, exists between the primary voltage $V_p$ and the output voltage Vout being developed by ferroresonant load circuit 20.

The current in capacitor 23 is $i_c = i_w + i_{sr}$. During the unsaturated intervals $T_a$–$T_b$ and $T_f$–$T_g$, capacitor 23 is charged by the current $i_w$, illustrated in FIG. 2d, flowing in transformer secondary output winding 22f, assuming the relatively small currents flowing in diodes 38 and 39 are neglected. The current $i_w$ represents that portion of the current flowing in the equivalent source inductance established by high leakage transformer 22 that is not being diverted to the load circuits coupled to secondary output windings 22c–22f. The natural frequency of the resonant circuit formed by capacitor 23 during the unsaturated intervals $T_a$–$T_b$ and $T_f$–$T_g$ is determined by the value of capacitor 23 and the value of the source inductance of high reactance transformer 22 as observed across terminals 50 and 51. This natural frequency may be below that of the horizontal deflection frequency $1/T_H$.

To provide regulation of the output voltage Vout, ferroresonant load circuit 20 delays the output voltage phase relative to the primary voltage $V_p$ by a varying amount $\Delta\theta$. The phase delay $\Delta\theta$ is necessary to permit power to be transferred from alternating input voltage source 11 to the load circuits coupled to transformer secondary output windings 22c–22f. The phase delay is a function of the input voltage amplitude and degree of loading on the secondary output windings.

Saturable reactor 21 switches from a relatively large inductance during the unsaturated intervals $T_a$–$T_b$ and $T_f$–$T_g$ of FIGS. 2a–2d, to a relatively small inductance during the saturated interval $T_b$–$T_f$ and $T_g$–$T_k$. The switching is a function of the magnetic saturation properties of the saturable reactor core 121. By means of this switching action, ferroresonant load circuit 20 responds to changes in input voltage Vin and to changes in loading of the secondary output windings of transformer 22 by adjusting the phase angle $\Delta\theta$ of the output voltage Vout relative to the primary voltage $V_p$, without producing substantial changes in the output voltage amplitude or half-cycle area or both.

FIGS. 3a–3e illustrate current and voltage waveforms developed by the power supply circuit 10 of FIG. 1, at zero beam current loading of ultor terminal U both at a nominal-line DC input voltage Vin, the solid-line waveforms, and at a high-line input voltage, the dashed-line waveforms. FIGS. 4a–4e illustrate voltage and current waveforms developed by power supply circuit 10 at nominal-line input voltage both with heavy beam current loading of ultor terminal U, the solid-line waveforms, and with no or light beam current loading of ultor terminal U, the dashed-line waveforms.

Figure 3:
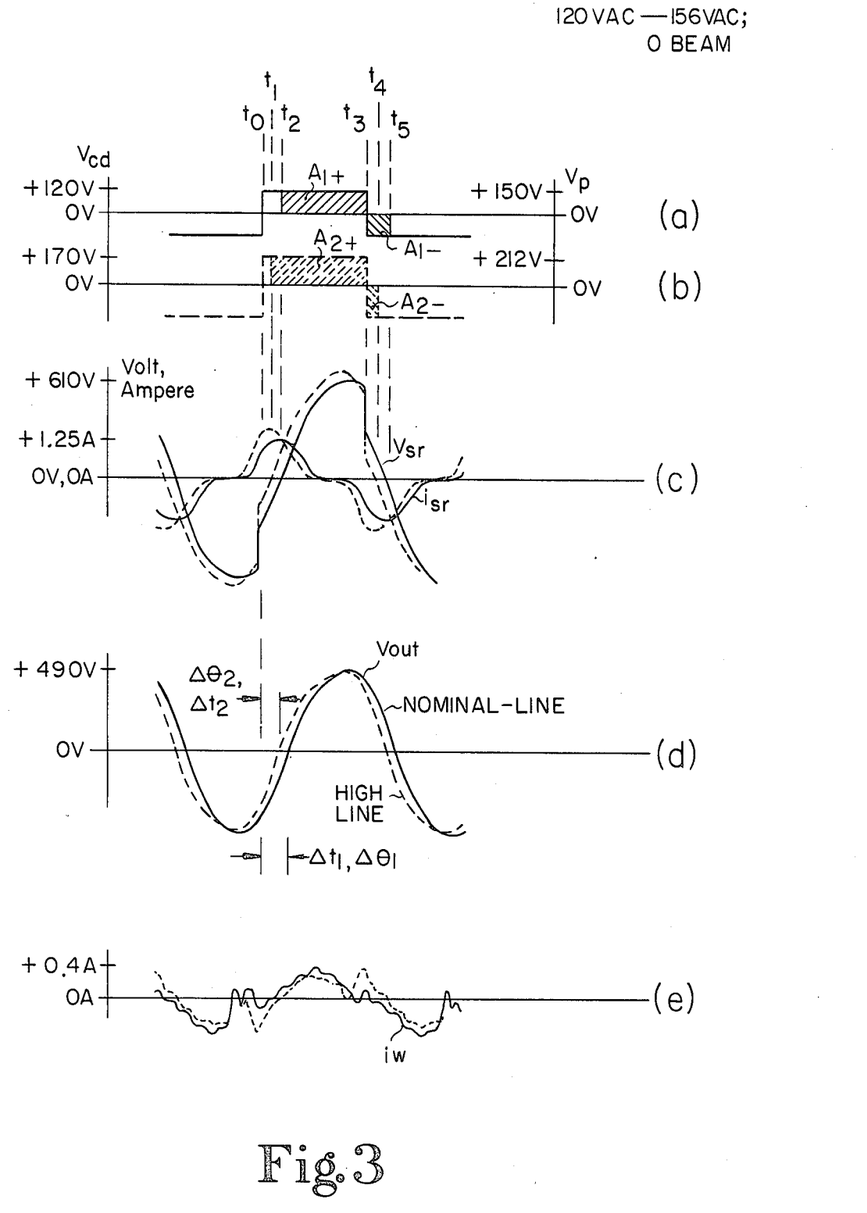
Figure 4:
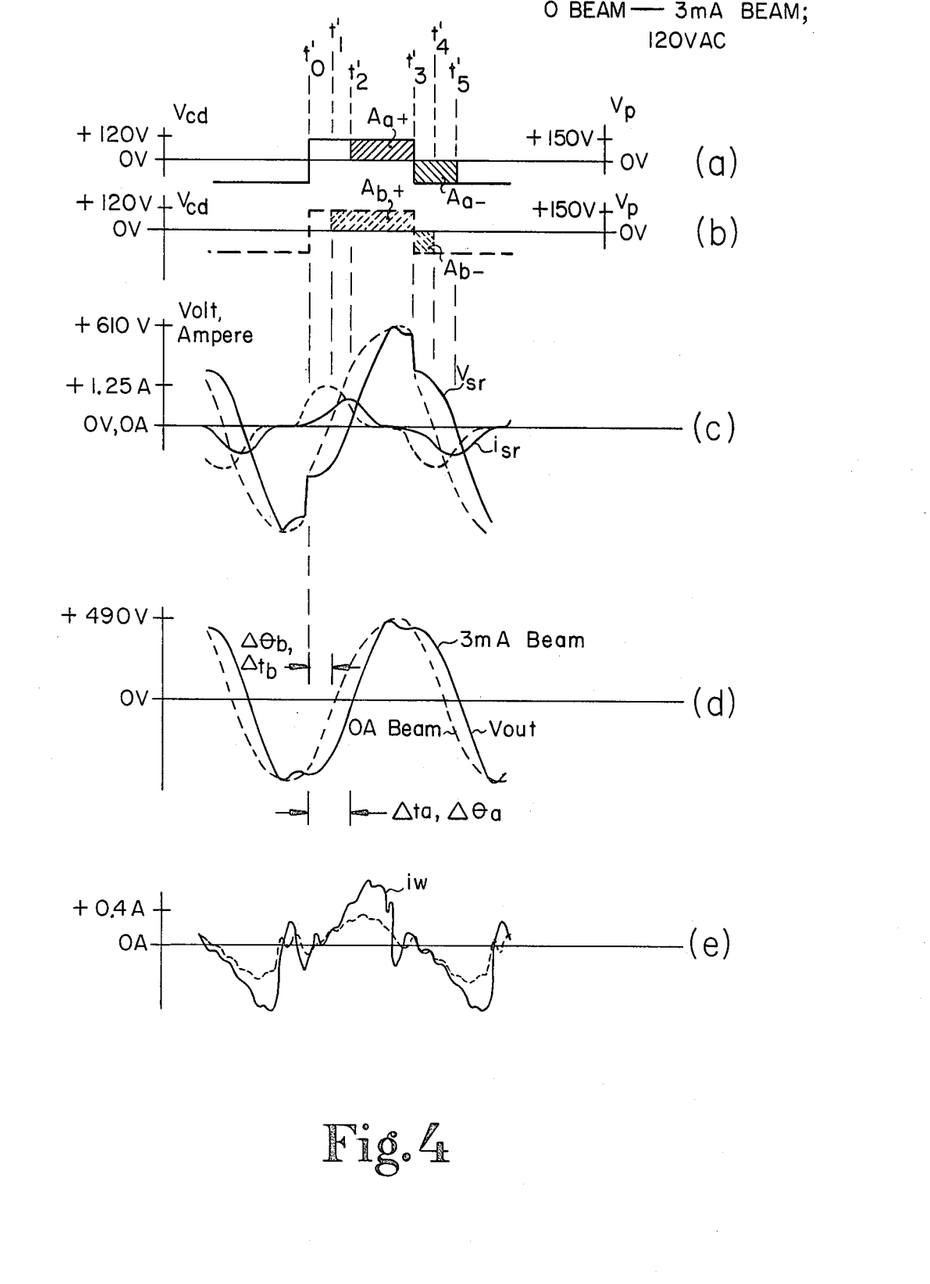

As illustrated in FIGS. 3a, b and d and FIGS. 4a, b and d, when the primary winding $V_p$ increases from a nominal-line to a high-line voltage, or when loading decreases on a transformer secondary output winding such as high voltage winding 22c, ferroresonant load circuit 20 responds by decreasing the phase delay $\Delta\theta$ of Vout relative to $V_p$ from a delay of $\Delta\theta_1$ to a delay of $\Delta\theta_2$, in the case of an input voltage amplitude increase, and from a delay of $\Delta\theta_a$ to a delay of $\Delta\theta_b$, in the case of a loading decrease.

Ferroresonant load circuit 20 adjusts the phase delay $\Delta\theta$, in part, by, at least momentarily, varying the duration of saturated intervals $T_b$–$T_f$ and $T_g$–$T_k$ of the circulating currents 60 and 61 and the duration of the unsaturated intervals $T_a$–$T_b$ and $T_f$–$T_g$ of FIG. 2b in response to changes in primary voltage $V_p$ and transformer secondary output winding loading. Momentarily decreasing the duration of the unsaturated intervals, for example, decreases the phase delay $\Delta\theta$ of the output voltage, Vout.

As previously mentioned, at time $T_b$, for example, of FIGS. 2b and 2c, reactor core 121 is substantially saturated and the inductance of reactor winding 21a decreases substantially to a relatively low saturated inductance compared to the unsaturated inductance of the reactor winding. Capacitor 23 during the saturated interval $T_b$–$T_f$ forms a resonant circuit with the parallel inductance of the source inductance exhibited by high reactance transformer 22 and the saturated inductance of saturable reactor winding 21a.

The duration of the circulating current 60 is a function not only of the natural frequency of the resonant circuit formed durng saturation of reactor core 121, but also, of the voltage, Vout, existing across capacitor 23 at the onset of saturation at time $T_b$, and of the amount of current $i_w$ flowing into capacitor 23 from secondary output winding 22f during the saturated interval $T_b$–$T_f$. The larger the magnitude of the capacitor voltage at the outset of saturation and, in general, the smaller the average magnitude of current flow to capacitor 23 from winding 22f during the saturated interval $T_b$–$T_f$, the longer will be the duration of the circulating current 60.

As the amplitude of the primary voltage $V_p$ begins to incrementally increase, for example, the output voltage, Vout, also tends to increase. The incremental increase in the amplitude of the output voltage Vout tends to shorten the duration of the unsaturated intervals $T_a$–$T_b$ and $T_f$–$T_g$, thereby decreasing the phase delay $\Delta\theta$.

The current $i_w$ supplied to ferroresonant load circuit 20 from transformer winding 22f also incrementally changes with the incremental increases in primary voltage $V_p$. The incremental change in current $i_w$ is such as to cause saturable reactor 21 to remain in saturation longer, thereby incrementally lengthening the duration of the circulating currents 60 and 61.

After several cycles of operation, the lengthening of the circulating current equals the shortening in unsaturated intervals $T_a$–$T_b$ and $T_f$–$T_g$, establishing a new equilibrium phase delay $\Delta\theta$ and an incrementally higher output voltage amplitude. The increase in output voltage occurs because the duration of the unsaturated intervals are shorter in the new equilibrium state.

Ferroresonant load circuit 20 provides output voltage regulation by being designed to respond to an increase in primary voltage $V_p$ with a sufficient decrease in phase delay $\Delta\theta$ so as to reestablish equilibrium operation with only a relatively small change in the unsaturated intervals and with only a relatively small change in output voltage.

One technique of providing proper ferroresonant load circuit response is to design the saturable reactor 21 so that it exhibits a relatively small saturated inductance during the circulating current interval. With a small saturated inductance, e.g., less than 500 microhenry and thus with a relatively large circulating current amplitude, the duration of the circulating current differs relatively little at differnt amplitudes of primary voltage. The duration of the unsaturated intervals and thus the amplitude of the output voltage therefore also differ relatively little.

A relatively small saturated inductance producing a relatively large circulating current results in increased $I^2R$ losses in the saturable reactor winding 21a and increased operating temperatures of the saturable reactor core 121 due to increased heat transfer from reactor winding to reactor core. A feature of the invention is the provision of relatively good output voltage regulation without the need for relatively large amplitude circulating currents in saturable reactor winding 21a.

As illustrated in FIG. 1, ferroresonant load circuit 20 includes, in addition to capacitor 23 and saturable reactor 21, the compensating drive winding 22g coupled in series with reactor winding 21a across capacitor 23. Thus, the saturable reactor circulating currents 60 and 61 also flow in winding 22g. Compensating drive winding 22g is tightly coupled magnetically with primary winding sections 22a and 22b. Compensating drive winding 22g represents an additional source of voltage $V_{cd}$, related to the alternating input and primary voltages. The voltage $V_{cd}$ is available for power transfer between winding 22g and primary winding sections 22a and 22b during the circulating current intervals $T_b$–$T_f$ and $T_g$–$T_j$ when the reactor winding 21a exhibits a lower, saturated inductance. The voltage $V_{cd}$ aids ferroresonant load circuit 20 in providing output voltage regulation.

With the additional source of voltage $V_{cd}$ available for output voltage regulation, the saturated inductance of saturable reactor 21 may be selected to be relatively large, 1–3 millihenry, for example, in order to reduce the circulating current amplitude by 3 to 4 times while still providing relatively good regulation of output voltage Vout. The reduced circulating current amplitude improves circuit efficiency and reduces the operating temperature of reactor core 121.

The voltage $V_{sr}$ impressed across reactor winding 21a is the sum of the output voltage Vout and the compensating drive voltage $V_{cd}$. With an increase in the amplitude of the primary voltage $V_p$, the phase delay of the output voltage Vout decreases as illustrated in FIG. 3d. Had the compensating drive winding 22g not been used, the lower designed-in circulating current and the higher designed-in reactor winding saturated inductance would have resulted in the output voltage and its half-cycle volt-second area substantially increasing with the increased primary voltage amplitude. By using compensating drive winding 22g, the voltage $V_{cd}$ is also impressed on reactor winding 21a in addition to the voltage Vout, producing an increase in the half-cycle area of the voltage $V_{sr}$ rather than an undesirable increase in the half-cycle area of the output voltage Vout.

As illustrated by the solid-line waveform of FIGS. 3a and 3c, at a nominal primary voltage $V_p$, the positive half-cycle of the reactor voltage $V_{sr}$ occurs between times $t_2$–$t_5$ relative to the positive half-cycle of primary voltage $V_p$ between times $t_0$–$t_3$. During the interval $t_2$–$t_5$, the net volt-second area of the compensating drive voltage $V_{cd}$ is also positive and equals the area $A_{1+}$ less the area $A_{1-}$ of FIG. 3a. The positive, half-cycle, volt-second area of the voltage Vout equals the difference between the positive half-cycle area of the saturable reactor voltage $V_{sr}$ and the net positive half-cycle area of the compensating drive voltage $V_{cd}$.

When the primary voltage $V_p$ increases, the compensating voltage $V_{cd}$ also increases in amplitude, as illustrated in FIG. 3b, in direct proportion to the increase in primary voltage, producing an increase in half-cycle volt-second area of the reactor voltage $V_{sr}$, illustrated in dashed-line waveform in FIG. 3c. The increase in primary voltage also produces a decrease in phase delay of the output voltage, dashed-line waveform of FIG. 3d, from a delay of $\Delta\theta_1$ to a delay of $\Delta\theta_2$. The decreased phase delay also produced a shift in the zero-crossover instants of the saturable reactor voltage $V_{sr}$ to the corresponding earlier instants $t_1$ and $t_4$.

The result of the zero-crossover shift in saturable reactor voltage $V_p$ and the increase in the amplitude of the compensating drive voltage $V_{cd}$ is an increase in the net volt-second area encompassed by the compensated drive $V_{cd}$ waveform during the positive half-cycle of the reactor voltage $V_{sr}$ between times $t_1$–$t_4$. As illustrated in FIG. 3b, the net positive area, $A_{2+}$ less $A_{2-}$, encompassed by the voltage $V_{cd}$ increases with an increase in primary voltage $V_p$. The increase in the net, half-cycle volt-second area of the compensating drive voltage provides for the increase in the reactor voltage half-cycle volt-second area, thereby enabling the half-cycle volt-second area of the output voltage to remain substantially constant, and enabling the amplitude of the output voltage Vout to remain relatively unchanged.

A similar effect is produced by the increase in net, half-cycle volt-second area of the compensating drive winding voltage when the loading on the transformer secondary windings 22c–22f decreases. As illustrated in FIG. 4c, the positive half-cycle area of the saturable reactor voltage $V_{sr}$, at zero beam current loading of ultor terminal U, the dashed-line waveform between times $t'_1$–$t'_4$, is greater than the corresponding positive half-cycle area of $V_{sr}$, at relatively heavy beam current loading, the solid-line waveform between times $t'_2$–$t'_5$. The decrease in phase delay of the output voltage Vout of FIG. 4d to a delay of $\Delta\theta_b$ produces earlier zero-crossover instants $t'_1$ and $t'_4$ of the saturable reactor voltage $V_{sr}$. Thus, the net, positive half-cycle volt-second area of the compensating drive voltage $V_{cd}$, at zero beam current loading, equals $A_{b+}$ less $A_{b-}$ and is greater than the net positive, half-cycle volt-second area at heavy beam current loading which equals $A_{a+}$ less $A_{a-}$. The increase in net, half-cycle volt-second area of the voltage $V_{cd}$, at lighter loading, provides for the increase in half-cycle volt-second area of the voltage $V_{sr}$, thereby enabling the half-cycle volt-second area of the output voltage Vout to remain substantially constant and enabling the amplitude of the output voltage Vout to remain relatively unchanged.

The effect of the compensating drive voltage $V_{cd}$ on the operation of the ferroresonant load circuit 20 may be alternatively explained as follows. Saturable reactor 21 is designed to magnetically saturate with a certain amount of volt-second area impressed across reactor winding 21a. The voltage across high leakage transformer secondary winding 22f is regulated as a function of the frequency of the alternating input voltage and of the value of the ferroresonant load circuit capacitor 23. Reactor winding 21a may be considered as a load coupled to transformer 22. To provide regulation, reactor winding 21a loads the transformer, whenever a higher voltage than the regulated voltage Vout is attempted to be induced across transformer output winding 22f. The regulation of the output voltage by ferroresonant load circuit 20 is analogous to the regulation provided by a zener diode when the zener diode produces a regulate DC voltage.

Without the use of the compensating drive winding 22g, even with a circuit design that produces relatively good regulation, an increase in the primary voltage $V_p$ still produces an increase in the output voltage Vout across the ferroresonant load circuit capacitor 23. The increase in Vout, however, will be of a smaller percentage than the percentage increase in primary voltage. A feature of the invention is that by providing compensating drive voltage $V_{cd}$, the percentage increase in output voltage Vout can be made substantially smaller than the percentage increase in primary voltage $V_p$ without requiring a relatively large circulating current to be produced in ferroresonant load circuit 20.

Since transformer compensating drive winding 22g is magnetically tightly coupled to primary winding sections 22a and 22b, the compensating drive voltage $V_{cd}$ rises by the same percentage, thereby producing a significant increase in voltage amplitude impressed across reactor winding 21a, as illustrated by the dashed-line and solid-line waveforms of the voltage $V_{sr}$ in FIG. 3c. Saturable reactor 21 responds to the increased impressed voltage across the reactor winding by producing an increased loading of the high reactance transformer secondary winding 22f so as to prevent the output voltage Vout from increasing to the same extent as does the primary voltage $V_p$. With a sufficient amplitude to the compensating drive voltage $V_{cd}$, the increase in output voltage Vout with primary voltage increase may be substantially reduced. In some circumstances the output voltage may even be made to decrease somewhat, if that is the desired response.

A still third way of explaining the effect of the use of compensating drive winding 22g on the operation of ferroresonant load circuit 20 is as follows. Compensating drive winding 22g, by being magnetically tightly coupled to primary winding sections 22a and 22b, serves as a path for the removal of power from ferroresonant load circuit 20. Because transformer winding 22g is in series with reactor winding 22a, the circulating current $i_{sr}$, developed in saturable reactor winding 21a by the resonant discharge of capacitor 23, also flows in winding 22g, thereby removing power from ferroresonant load circuit 20. Since the compensating drive voltage $V_{cd}$ reversed polarity during the flow of circulating current, the net amount of power removed by winding 22g is a function of the phase delay of the output voltage Vout relative to the primary voltage $V_p$. Ferroresonant load circuit 20, by producing a varying phase delay with input voltage and loading changes, varies the amount of power removed through winding 22g in a manner that enhances the regulation of output voltage Vout.

Core 122 of high leakage transformer 22 may be constructed, illustratively, as a three-legged transformer with the primary winding sections 22a and 22b wound on one leg of the core, and the secondary output windings 22c–22f wound on another leg of the three-legged core. By being wound on different legs, a relatively large amount of leakage inductance is created between primary winding sections 22a and 22b and secondary output windings 22c–22f, enabling transformer 22 to present a high source impedance to all the load circuits coupled to the secondary output windings, including ferroresonant load circuit 20. Winding 22g, to produce the compensating drive voltage $V_{cd}$, is wound around the same leg upon which the primary winding sections 22a and 22b are wound.

In an alternative embodiment, the compensating drive voltage $V_{cd}$ may be obtained from a winding 22g', wound around the shunt leg of the three-legged core 122. In FIG. 1, the shunt-wound compensating drive winding is illustrated as the dashed-line inductance 22g'. By being wound on the shunt leg, the magnetic flux linking winding 22b' represents the difference between flux linking primary winding sections 22a and 22b and the flux linking secondary output winding 22f. Thus, the compensating drive voltage $V_{cd}$ produced by the shunt-wound winding 22g' is representative of the difference between the primary voltage $V_p$ and the secondary output voltage Vout and varies with primary voltage variations to provide enhanced output voltage regulation.

An advantage of using a compensating drive voltage developed by a shunt-wound transformer winding is that saturable reactor winding 21a may be designed with fewer turns. Such an arrangement, however, may require the compensating drive winding to be designed with a greater number of turns than would have been required for a winding magnetically tightly coupled with the primary winding.

As an illustrative embodiment of high reactance transformer 22 producing waveforms similar, but not necessarily identical, to the waveforms of FIGS. 2a–2d, the primary winding inductance, $L_p$, as measured from the center tap terminal to an end terminal, is 1.5 millihenry; the secondary inductance $L_s$ of secondary winding 22f is 3.5 millihenry with one of the primary winding sections short-circuited, and the mutual inductance, M, between the above two described windings is 2.4 millihenry. The compensating drive winding 22g is tightly coupled to each of the primary winding sections. The turns ratio of winding 22a to winding 22g is 1.25 to 1. The core material may be a manganese-zinc ferrite and the transformer core geometry may be of an suitable arrangement, such as a three-legged core, that will provide the above inductance values while maintaining the core substantially magnetically unsaturated.

The capacitance of capacitor 23 may be 0.022 microfarad; the core material saturation flux density, cross-sectional area and number of turns of saturable reactor 21 may then be selected so as to produce a Vout waveform similar to that of FIG. 2d, with the unsaturated inductance of reactor winding 21a being relatively large, on the order of 40 millihenry. The number of turns, the core geometry, such as mean magnetic path length and cross-sectional area, and the core material B-H characteristic are such that when substantial magnetic saturation occurs, the inductance of reactor winding 21a decreases substantially to around 2 millihenry, or even less than that at peak current. A suitable core material may be a ferrite such as a lithiumbismuth ferrite which has the added advantage of a relatively small change in Bsat with core operating temperature change when compared to many other ferrites. The core construction may be in the shape of a toroid, or in any other suitable shape to produce the above inductance values.

By using a separate power transformer and a separate saturable reactor regulator coupled to a secondary output winding of the power transformer, a plurality of regulated output voltages may be developed with only one saturable reactor winding being coupled to only one of the transformer secondary windings. Similarly, only one compensating element may be used to provide enhanced regulation of more than one output voltage.

I claim:

1. A saturating core power supply providing a regulated ultor voltage for a television display system, comprising:
   a source of alternating input voltage;
   a saturable reactor including a magnetizable core and a winding located on said core;
   means coupled to said source and to said saturable reactor winding for developing a magnetizing current to generate an alternating magnetic flux in said magnetizable core that links said winding so as to develop an alternating polarity output voltage;
   a capacitance for developing a circulating current that generates a magnetic flux in a core section associated with said reactor winding that aids in magnetically saturating said associated core section during each cycle of said alternating polarity output voltage;
   a source of compensating voltage coupled to said saturable reactor winding and related to said alternating input voltage so that the combined effect of the development of said circulating current by said capacitance and the application of said compensating voltage to said saturable reactor winding provides regulation of said alternating polarity output voltage;
   an ultor terminal; and
   means including a high voltage rectifier arrangement coupled to said ultor terminal and responsive to said regulated alternating polarity output voltage for developing a regulated ultor voltage at said ultor terminal.

2. A saturating core power supply providing a regulated B+ scanning voltage for a deflection generator, comprising:
   a deflection winding;
   a deflection generator energized by a B+ scanning voltage to generate scanning current in said deflection winding;
   a source of alternating input voltage;
   a saturable reactor including a magnetizable core and a winding located on said core;
   means coupled to said source and to said saturable reactor winding for developing a magnetizing current to generate an alternating magnetic flux in said magnetizable core that links said winding so as to develop an alternating polarity output voltage;

a capacitance for developing a circulating current that generates a magnetic flux in a core section associated with said saturable reactor winding that aids in magnetically saturating said associated core section during each cycle of said alternating polarity output voltage;

a source of compensating voltage coupled to said saturable reactor winding and related to said alternating input voltage so that the combined effect of the development of said circulating current by said capacitance and the application of said compensating voltage to said saturable reactor provides regulation of said alternating polarity output voltage; and means, responsive to said regulated alternating polarity output voltage for developing said B+ scanning voltage as a regulated voltage.

3. A power supply according to claim 2 including an ultor terminal and means including a high voltage rectifier arrangement coupled to said ultor terminal and responsive to said regulated output voltage for developing a regulated ultor voltage at said ultor terminal.

4. A power supply according to claim 1 wherein said circulating current flows through said source of compensating voltage.

5. A power supply according to claims 1 or 4 wherein said magnetizing current developing means comprises a transformer having a plurality of windings, with said source of alternating input voltage being coupled to a first of said plurality of windings and with said regulated alternating polarity output voltage being developed across a second of said plurality of windings and wherein said source of compensating voltage comprises a third of said plurality of windings.

6. A power supply according to claim 5 wherein said transformer second winding is magnetically isolated from said saturable reactor winding such that the magnetic flux that flows in said reactor core does not link said transformer second winding to any significant extent.

7. A power supply according to claim 5 wherein said saturable reactor winding is coupled in a series arrangement with said transformer third winding across said capacitance.

8. A power supply according to claim 7 wherein the AC zero-crossover instants of said regulated alternating polarity output voltage is shifted in time relative to corresponding AC zero-crossover instants of the alternating polarity voltage developed across said transformer third winding, the amount of time-shift varying with variations in said input voltage and wherein said regulated alternating polarity output voltage comprises the algebraic summation of the alternating polarity voltage developed across said saturable reactor winding and the alternating polarity voltage developed across said transformer third winding and and wherein said transformer second and third windings are polarized relative to each other so as to maintain the half-cycle voltage-second area of said output voltage relatively unchanged with said input voltage variations.

9. A power supply according to claim 8 wherein said transformer second winding is magnetically isolated from said saturable reactor winding such that the magnetic flux that flows in said reactor core does not link said transformer second winding to any significant extent.

10. A power supply according to claim 9 wherein said transformer third winding is magnetically relatively tightly coupled to said transformer first winding and wherein said transformer second winding is magnetically relatively loosely coupled to said transformer first winding.

11. A power supply according to claim 10 wherein said regulated ultor voltage developing means includes a fourth of said plurality of transformer windings coupled to said high voltage rectifier arrangement.

12. A power supply according to claims 2 or 3 wherein said magnetizing current developing means comprises a transformer having a plurality of windings, a first of said plurality of windings being coupled to said alternating input voltage source, a second of said plurality having said regulated output voltage developed thereacross, said compensating voltage source comprising a third of said plurality and said B+ scanning voltage developing means including a fourth of said plurality coupled to said deflection generator and wherein said transformer first and third windings are magnetically relatively tightly coupled to each other and wherein said transformer second and fourth windings are magnetically relatively tightly coupled to each other.

13. A power supply according to claim 11 wherein said circulating current flows both in said saturable reactor winding and in said transformer third winding.

14. A power supply according to claim 13 wherein said transformer second winding is magnetically relatively loosely coupled to said transformer first winding.

15. A magnetically regulated power supply, comprising:

a source of alternating input voltage;

a high leakage transformer having a plurality of windings, a first of said plurality being coupled to said source for developing an alternating polarity voltage across a second of said plurality;

a saturable reactor including a magnetizable core and a reactor winding wound on said core, said reactor winding and said transformer second winding being conductively coupled to develop an alternating polarity voltage across said reactor winding, said transformer second winding being magnetically isolated from said saturable reactor such that the magnetic flux flowing in said reactor core does not link said transformer second windings;

a capacitance coupled to a winding of said saturable reactor for developing a circulating current that aids in magnetically saturating a portion of said reactor core associated with the reactor winding that is conductively coupled to the transformer second winding;

a third of said plurality of transformer windings coupled to one of said capacitance and said conductively coupled reactor winding such that circulating current flows in said transformer third winding, said transformer third winding applying a compensating voltage to said conductively coupled reactor winding so that the combined effect of magnetically saturating said reactor core portion and the application of said compensating voltage to said conductively coupled reactor winding provides regulation of the alternating polarity voltage developed across said transformer second winding;

a fourth of said plurality of transformer windings responsive to the regulated voltage developed across said transformer second winding for developing a regulated output voltage across said fourth winding; and
   a load circuit coupled to said transformer fourth winding and energized by said regulated output voltage.

16. A magnetically regulated power supply according to claim 15 wherein said reactor winding and said transformer third winding are coupled in series across said capacitance, and wherein said capacitance is coupled across said transformer second winding.

17. A magnetically regulated power supply according to claim 16 wherein the magnetic flux linking said transformer third winding is representative of the difference between the magnetic flux linking said transformer first winding and the magnetic flux linking said transformer second winding.

18. A magnetically regulated power supply according to claim 17 wherein the magnetizable core of said transformer comprises a three-legged core with each one of said first, second and third transformer windings being located on a different one of the three legs of the transformer core.

19. A magnetically regulated power supply according to claim 16 wherein said transformer first and second windings are magnetically loosely coupled to each other, and wherein said transformer first and third windings are magnetically tightly coupled to each other.

20. A television display incorporating the magnetically regulated power supply in accordance with claims 15, 16, 17 or 19 wherein said television display includes a deflection winding and a deflection generator coupled thereto, said deflection generator being energized by a B+ scan supply voltage for generating scanning current in said deflection winding, and wherein said television display includes an ultor terminal having an ultor accelerating potential developed thereat and wherein said magnetically regulated power supply includes means responsive to said regulated output voltage for developing therefrom one of said B+ scan supply voltage and said ultor accelerating potential.

21. A television display according to claim 20 wherein said magnetically regulated power supply includes means responsive to said regulated output voltage for developing therefrom the other one of said B+ scan supply voltage and said ultor accelerating potential.

* * * * *